United States Patent

[11] 3,546,389

[72] Inventors Egide Jacob Hendrik De Raedt Hoboken; Andreas Michiel Cyriel Corneel Peeters, Patrijzenlei Schoten; George Pieter Adolf Mathildis Debruyne, Lebbeke, Belgium

[21] Appl. No. 598,370
[22] Filed Dec. 1, 1966
[45] Patented Dec. 8, 1970
[73] Assignee International Standard Electric Corporation
[32] Priority Dec. 13, 1965
[33] Belgium
[31] No. 673,621

[54] TELECOMMUNICATION SWITCHING SYSTEM
23 Claims, 2 Drawing Figs.

[52] U.S. Cl. .......... 179/18
[51] Int. Cl. .......... H04m 15/06
[50] Field of Search .......... 179/18.61, 27.12

[56] References Cited

UNITED STATES PATENTS

| | | | |
|---|---|---|---|
| 2,131,572 | 9/1938 | Saunders | 179/27 |
| 2,200,820 | 5/1940 | Boswau | 179/27 |
| 2,879,338 | 3/1959 | Joel, Jr. | 179/18 |
| 3,015,698 | 1/1962 | Pedrick | 179/18 |
| 3,137,770 | 6/1964 | Doyle | 179/18 |

*Primary Examiner*—Kathleen H. Claffy
*Assistant Examiner*—David L. Stewart
*Attorneys*—C. Cornell Remsen, Jr., Rayson P. Morris, Percy P. Lantzy, J. Warren Whitesel, Phillip A. Weiss and Delbert P. Warner

ABSTRACT: The invention provides a circuit for trapping malicious calls and identifying the station making the call, as to an order clerk, for example. The system does this by classifying subscriber lines. Then, depending upon the classification, identity of the calling line is recorded as soon as the call is received.

TELECOMMUNICATION SWITCHING SYSTEM

The invention relates to a telecommunication switching system including stations, switching means and control circuits, e.g. registers for establishing communications between calling and called stations, identifying means for determining the identity of each calling station, and an adapter circuit associated to each called station of a predetermined class for starting the operation of said identifying means which subsequently transfer the thus determined identity to a storage device associated to a called station of said predetermined class.

Such a switching system is already known from the Dutch Pat. No. 78,382. This known switching system has the disadvantage of being only operative when the calling and called stations belong to the same exchange. A further disadvantage of this system is that the adapter circuits are individually provided with a circuit indicating that the called station belongs to a predetermined class.

An object of the invention is to provide a telecommunication system which does not present these disadvantages.

The switching system according to the invention is characterized in that it further includes a circuit which indicates the class of the call station and which is interrogated by a control circuit associated to the exchange of the called station after the number of the called station has been registered in said control circuit and that said adapter circuit only starts the operation of said identifying means upon the detection of a called station of said predetermined class.

Another characteristic feature of the switching system according to the invention is that said identifying means are adapted to transmit said identity to said storage device in the form of multifrequency signals.

The invention also relates to a telecommunication switching system which is characterized in that subscriber stations of a predetermined class are each coupled with their line circuit via an adapter circuit and that upon the closure of the subscriber loop in each such subscriber stations a loop is closed towards the associated line circuit, the latter loop including means to maintain said loop closed even when there is signalled from said subscriber station to said adapter circuit by means of temporary openings of the subscriber loop, e.g. by dialling of digits by means of a dialling disc, and on condition that each of these openings does not exceed a predetermined time interval.

The above mentioned and other objects and features of the invention will become more apparent and the invention itself will be best understood by referring to the following description of embodiments taken in conjunction with the accompanying drawings in which.

Figure 1:
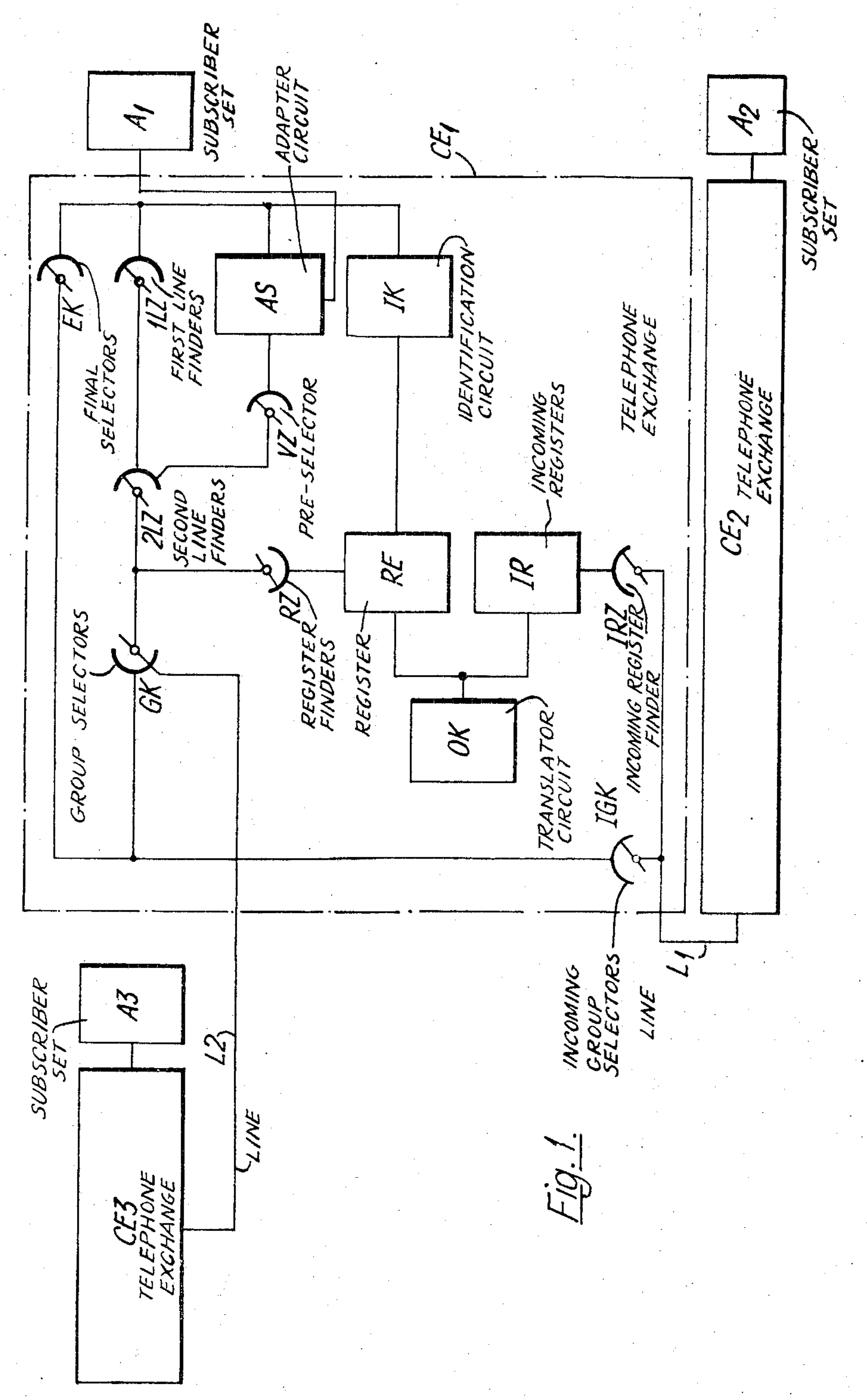
FIG. 1 represents a telecommunication switching system according to the invention.

Principally referring to FIG. 1 the telephony switching system shown includes three similar exchanges CE1, CE2 and CE3 to which the subscriber sets or subscriber stations A1, A2 and A3 are connected respectively, each of these subscriber sets including a telephone. As the three exchanges are identical only exchange CE1 is represented in some detail. This exchange includes a number of first line finders 1LZ, second line finders 2LZ, group selectors GK, incoming group selectors IGK, final selectors EK, registers RE, register finders RZ, incoming registers IR, incoming register finders IRZ and moreover an identification circuit IK and a translator circuit OK. All these devices are interconnected in a known manner. Further, a number of subscriber sets are connected to their respective line circuits via adapter circuits AS which are themselves connected to a number of preselectors VZ coupled with the second line finders 2LZ. The exchange CE1 is connected to the exchange CE2 via the line L1, whereas the exchange CE2 is connected to the exchange CE3 via the line L2.

Referring to FIG. 1 the operation of the telephony system shown is hereinafter briefly described. First the case is treated wherein the adapter circuit AS which is associated to the subscriber set A1 of the exchange CE1 is built up in such a way that the identities of the subscribers of the exchanges CE1 and CE2 which make malicious calls to this set A1 are registered, together with the identity of the called sets, in a storage device which is located at an operator's location A3 of exchange CE3 situated in the zone center. Afterwards the case will be considered wherein the adapter circuit AS is built-up in such a way that the identities of the subscribers of the exchanges CE1 and CE2 which make calls to the subscriber set A1 are registered in a storage device arranged at the location of the subscriber set A1. A very interesting application of the latter case is for instance for traders who receive per telephone orders for goods, since with the registered telephone numbers of those ordering these goods a control may be performed, thus excluding abuse.

When a local call emanates from a subscriber set A'1 (not shown) of the exchange CE1 and is destined to the subscriber set A1 which is coupled to its line circuit via the adapter circuit AS, the subscriber set A'1 is connected in a known manner to a free registered circuit RE via a first line finder 1LZ, a second line finder 2LZ and a register finder RZ and the identity i.e. the number of the called subscriber set A1 is registered in this register RE. This register interrogates the translator circuit OK by means of the registered number in order to know the class of the called subscriber set. In the present case the translator OK will ascertain that this class is such that the identity of the calling subscriber set A'1 has to be determined. As a consequence thereof the register RE is brought in a condition wherein it is able to receive and transmit multifrequency signals having voice frequency (MVF signals). In a known manner this register RE then controls its connection with the called subscriber set A1, and hence with the adapter circuit AS, via a register finder RZ, a group selector GK and a final selector EK. Consequently, in the adapter circuit AS a receiver and transmitter device (ZO in FIG. 2) for MVF signals is connected to the line circuit of the subscriber set A1. It should be noted that the identity of this subscriber set A1 is registered in a permanent way in the device ZO. This device ZO then transmits an MVF request signal to the register RE requesting the first digit of the identity or the number of the calling subscriber A'1. The receipt of this signal in register RE means that this register RE must address the identifying circuit IK. This circuit executes the requested identification operation of the calling subscriber set A'1 and transmits the ascertained identity to register RE wherein it is registered. The requested first digit of this identity is then transmitted to the adapter circuit AS in the form of an MVF signal and registered in the above transmitter and receiver device ZO, whereafter said device ZO requests the second digit of the identity from the register RE by means of another request signal, etc., until all digits of the identity have been received and registered in this device ZO. From the transmitter and receiver device ZO an MVF signal is finally transmitted to register RE indicating that the switching means of the established connection must be switched under the control of the called subscriber set A1. Register RE is then disconnected, If the receipt of the identity in the adapter circuit is correct ringing tone is transmitted to the calling subscriber set A'1 and ringing current is applied to the called subscriber set A1. When the subscriber of the latter set hooks off his telephone, the established connection is switched under his control. If he ascertains that the call is a malicious one he dials the digit 1 by means of the dialling disc of his telephone set. At the receipt of this digit in the adapter circuit AS a preselector VZ which has access to the adapter circuit AS is started and two characteristic potentials are applied to this preselector VZ, these potentials characterizing the adapter circuit. This preselector VZ establishes via a second line finder 2LZ and a register finder RZ a connection with a register RE. Upon the detection of these characteristic potentials and without further information being required the register RE establishes its connection with a storage device (not shown) arranged at an operator's location A3 in the exchange CE3 via a group selector GK, line L2 and switching means in the exchange CE3. After the establishment of this connection the register RE is disconnected and the subscriber set A1, and hence the adapter circuit AS, is connected to the storage device arranged at the operator's location A3. The transmitter and receiver device ZO in this adapter circuit AS subsequently starts the transmission to this storage device of the identities of the calling and called subscriber sets registered therein. Afterwards the called subscriber is brought in communication with the operator who may eventually inform the called subscriber about the number of the calling subscriber. The operator also informs the called subscriber A1 when the latter may hook on his telephone and generates a signal due to which a count pulse is sent from the cord circuit of the established connection to the adapter circuit and due to which the latter circuit is partially reset to its rest condition. This circuit is only completely reset to its rest condition when the called subscriber A1 hooks on his telephone after the calling subscriber already hooked on his one.

When a call emanates from a subscriber set A2 of the exchange CE2 and is destined to the subscriber set A1 which is coupled to the adapter circuit AS, the subscriber set A2 is connected in the known manner to a free register RE of the exchange CE2 and in this register the number of the called subscriber set A1 is registered. The register controls its connection with an incoming register IR of the exchange CE1 via a register finder, a group selector and an incoming register finder IRZ, whereafter the former register transmits the number of the called subscriber set A1 in the form of MVF signals to this incoming register IR which is brought in a condition to receive and to transmit these signals. This register IR then interrogates the translator circuit OK in order to know the class of the called subscriber set A1. In the present case the translator circuit OK will ascertain that this class is such that the identity of the calling subscriber set A2 must be determined. Register IR then controls in a known manner its connection with the called subscriber set A1, and hence with the adapter circuit AS, via a register finder RZ, an incoming group selector GK and a final selector EK, whereafter the incoming register IR is disconnected and a connection is established between the register in the exchange CE2 and the adapter circuit AS. The remainder of the operations is analogous to those described above in case of a local incoming call in the exchange CE1. It should be noted that after interrogation of the translator circuit OK the register of the exchange CE2 must not be brought in a condition wherein it is able to transmit and to receive MVF signals since this register is already in such a condition at that moment.

It should also be remarked that instead of transmitting the identity of the subscriber set A1 to the storage device at the operator's location the identity of the associated adapter circuit could be transmitted to this storage device. This is even more advantageous since the latter identity is simpler than the former in view of the smaller number of adapter circuits.

When all the numbers of the subscribers such as A'1 and A2, making calls to the subscriber set A1 coupled to the adapter circuit AS, must be registered in a storage device arranged at the location of the subscriber set A1 instead of at the operator's location A3 everything takes place as described above until the telephone is hooked off by the subscriber in set A1. Due to this the identity registered in the transmitting and receiver device of the adapter circuit AS is transmitted to the storage device in the subscriber set A1 in the form of AC impulses and during the conversation of the subscribers A'1 or A2 and A1 i.e. in a manner which is similar to that described in the above-mentioned Dutch Pat. No. 78,382.

Figure 2:
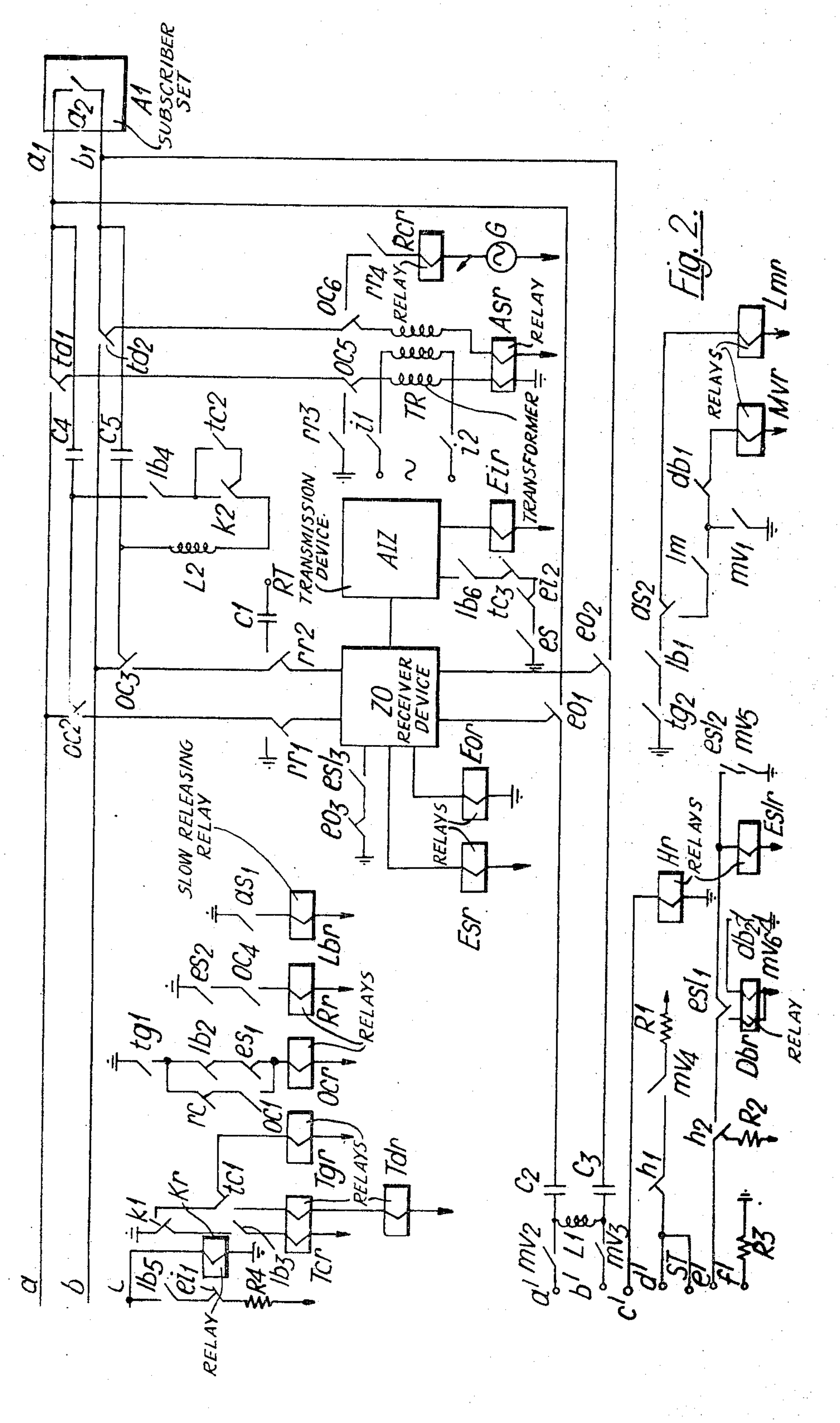
FIG. 2 shows an adapter circuit forming part of the switching system of FIG. 1.

With reference to both the FIGS. 1 and 2 the operation of the switching system shown in case of malicious calls will now be described in detail from the moment register RE of the exchange of the calling subscriber set A'1 has been connected to the adapter circuit AS of the called subscriber set A1 and is in a condition wherein it is able to transmit and receive MVF signals. It should be noted that the read and pulse transmission device AIZ and transformer Tr in FIG. 2 are hereby not considered.

After the establishment of this connection register RE connects a battery to the *c*-wire of the line circuit which is connected to the adapter circuit AS. Consequently relay K*r* is energized therein. Relay T*gr* is then energized via contacts *k* and *tc*1 followed by relay O*cr* which is operated via contacts *tg*1, *lb*2 and *es*1. Relay O*cr* is locked via contacts *tg*1, *rc* and *oc*1 and the line wires *a* and *b* of the line circuit are connected to the transmitter and receiver device ZO via contacts *oc*2, *rr*1 and *oc*3, *rr*2. As described above the identity of the calling subscriber set A'1 is determined and registered in register RE and afterwards transmitted to the transmitter and receiver device ZO of the adapter circuit AS. Also register RE is advised that the connection between the calling and called subscriber sets A'1 and A1 is to be switched under the control of the called subscriber set A1.

When the identity of the calling subscriber set A'1 in the device ZO has been registered in a correct manner relay E*sr* is energized. Consequently relay R*r* is energized via contacts *es*2 and *oc*4, whereas relay O*cr* remains energized via contacts *rc* and *oc*1 notwithstanding the opening of contact *es*1. Ringing tone is then transmitted to the calling subscriber set A'1 from terminal RT via capacitor C1, contacts *rr*2 and *oc*3, line wire *b*, gravity switch (not shown) in the telephone set of the subscriber set A'1, line wire *a*, contacts *oc*2 and *rr*1, ground. At the same time ringing current is applied to the called subscriber set A1 in the following circuit: ground, contacts *rr*3, *oc*5 and *td*1, line wire *a*1, ringing device (not shown) in the subscriber set A1, line wire *b*1, contacts *td*2, *oc*6 and *rr*4, winding of relay R*cr*, AC generator G, battery. Relay R*cr* is a slow energizing relay and cannot be energized in this circuit by the AC current flowing therein. When the called subscriber of set A1 hooks off his telephone and thus closes his subscriber's loop, DC current is able to flow in the latter circuit via contact *a*2 of this set due to which relay R*cr* is energized. By the opening of contact *rc* relay O*cr* releases and due to the subsequent displacement of contacts *oc*2 to *oc* 6 the ringing tone and ringing current together with the receiver and transmitter device ZO are disconnected from the line wires, whereas relay R*r* releases. Also relay R*cr* releases. By the above hooking-off operation relay A*sr* is moreover energized as follows: ground, left-hand winding of relay A*sr*, contacts *oc*5 and *td*1, line wire *a*1, contact *a*2 of the telephone of set A1, line wire *b*1, contacts *td*2 and *oc*6, right-hand winding of relay A*sr*, battery. Consequently, the slow-releasing relay L*br* is energized via contact *as*1 due to which an energizing circuit for relay L*mr* is prepared via contact *lb*1. A loop is closed towards the line circuit of subscriber set A1 via line wire *a*, contacts *oc*2, *lb*4 and *k*2, coil L2, contact *oc*3 and line wire *b*, due to which the response of this subscriber set A1 is signalled. As long as this loop remains closed the connection with the calling subscriber set A'1 is locked.

When the called subscriber of set A1 ascertains that the call is a malicious one, he dials digit 1 with his dialling disc, i.e. he transmits a special signal due to which the connection between the line wires *a*1 and *b*1 in the subscriber set A1 is temporarily opened. Consequently relay A*sr* temporarily releases, so that relay L*mr* of the adapter circuit AS is energized in the following circuit: ground, contacts *tg*2, *lb*1, and *as*2, winding of relay L*mr*, battery. It should be noted that notwithstanding the temporary opening of the subscriber's loop the loop to the line circuit is not interrupted since relay L*br* is of a slow releasing type. After relay A*sr* has again been energized relay M*vr* is energized as follows: ground, contacts *tg*2, *lb*1, *as*2, *lm* and *db*1, winding of relay M*vr*, battery. Relay M*vr* is locked via its contact *mv*1 and contact *db*1, whereas the transmitter and receiver device ZO is connected to the terminals *a'* and *b'* via contacts *eo*1 and *eo*2, capacitors C2 and C3 and contacts *mv*2 and *mv*3. Via contacts *mv*2 and *mv*3 and coil L1 a loop is thus closed in the adapter circuit due to which a call is simulated therein. A battery is connected to the test terminal *d'* and to the start wire ST via resistance R1 and contacts *mv*4 and *h*1, whereas a battery and a ground are applied to terminals *e'* and *f* via a resistance R2 and a contact *h*2 and a resistance R1 respectively. The terminals *a'* to *f* may be connected to the corresponding brushes of a preselector VZ. It should be noted that resistance R2 characterizes the fact that an adapter circuit is concerned, whereas resistance R1 characterizes the fact that this adapter circuit is used for the detection of malicious calls.

By the presence of the test and start potential at the test terminal *d'* a test is carried out to a free preselector VZ and due to the presence of this potential on the start wire ST, which terminates in the starting circuit (not shown) of the preselector VZ, the movement of this preselector VZ is started if it is free. The preselector establishes a connection with a free register RE via a second line finder 2LZ and a register finder RZ. When the brushes of the preselector VZ make contact with the respective terminals *a'* to *f* and a connection is established with a free register RE the following happens. Upon the detection in the register RE of the characteristic potentials on the *e'* and *f* wires caused by the characteristic resistances R2 and R1, this register RE starts the establishment of its connection with an operator's location A3 in the exchange CE3 via a group selector GK, line L2 and switching means in this exchange CE3. Also, in this register RE a battery is connected to the *c'* terminal of the adapter circuit AS due to which relay Hr is energized therein. By the opening of contact *h*1 the test and start potential is removed from the test terminal *d'* and from the start wire ST due to which the preselector VZ is stopped, whereas due to this displacement of contact *h*2 the characteristic potential is removed from the *e'* terminal which is then connected to the winding of relay E*slr* via contacts *h*2 and *esl*11. Register RE is then disconnected and during this period a ground is temporarily applied to the *e'* terminal so that relay E*slr* is energized via contacts *h*2 and *esl*1. Relay E*slr* is locked via contacts *es* 12 and *mv*5. It should be noted that relay D*br* cannot be energized after the displacement of contact *esl*1, even if a ground is still present on the *e'* terminal, since an increased voltage is required for its operation. Due to the closure of contact *es*13 and as contact *eo*3 is closed, a start is given to the device ZO which transmits the identities of the calling and called subscriber sets A'1 and A1 registered therein to a storage device arranged at the operator's location A3. This transmission is performed in the form of MVF signals and when finished relay E*or* is energized. Due to the displacement of contacts *eo*1 and *eo*2 the subscriber set A1 and the operator's location are now brought in communication with one another. When the subscriber of set A1 is informed by the operator that he may hook on his telephone, this operator generates a signal due to which from the seized cord circuit and via the preselector VZ a count pulse of +90 volts is sent to the adapter circuit AS where it is applied to terminal *e'*. Consequently, relay D*br* is energized via contacts *h*2 and *esl*1 and its left-hand winding and is locked via its right-hand winding and contacts *db*2 and *mv*6. By the opening of contact *db*1 relay M*vr* releases and by the subsequent displacement of contacts *mv*2 and *mv*3 the connection between the subscriber set A1 and terminals *a'* and *b'* is opened, whereas by the opening of contact *mv*6 relay E*slr* releases. When the subscriber of set A1 now hooks on his telephone relays A*sr* and L*br* release so that the loop to the line circuit is opened and the connection with set A'1 is interrupted when the subscriber of the latter set has also hooked on his telephone. In the adapter circuit relay K*r* and all relays still energized release so that this circuit is completely reset to its rest position.

The switching operations executed when a call is made between two subscribers of different exchanges will not be described in detail since these switching operations are almost completely similar to those described above, as already mentioned.

In case the numbers of the calling subscribers making calls, malicious or not, to the subscriber set A1 provided with the adapter circuit AS must be registered in a storage device of the called subscriber set A1, the operation is as follows. As in the above described case of malicious calls the identity of the calling subscriber is registered in the device ZO due to which relay E*sr* is energized; ringing tone and ringing current is transmitted to the calling and called subscriber sets respectively and when the telephone in the subscriber set A1 is hooked off relay A*sr* is energized followed by the operation of relay L*br*. The operation of the read and pulse transmitting device ASZ is then started via contacts *es*, *ei*2, *tc*3 and *lb*6 due to which a pulse relay I*r* (not shown) is energized therein in function of the read digits. By the contacts *i*1 and *i*2 of this relay I*r* corresponding AC pulses are transmitted to a storage device (not shown) in the subscriber set A1 via transformer T*r*, contacts *oc*5, *oc*6 and *td*1, *td*2 and both line wires *a*1, *b*1 in parallel. This transmission as well as the storage may for instance be performed as described in detail in the Dutch Pat. No. 78,382.

It should be noted that the line circuit of the called subscriber set A1 is artificially being kept busy by the battery which is applied to the *c*-wire in the adapter circuit A*s* via resistance R4 and contacts *ei*1 and *lb*5 since relay K*r* is thus locked. This is done to avoid that the registering of the identity in the storage device of the subscriber set A1 would be stopped when hooking on the telephone in the subscriber set A'1. After the transmission of the identity has been finished device AIZ energizes relay E*ir* which removes the starting potential from this device and the holding potential from the *c*-wire via contacts *ei*2 and *ei*1 respectively.

It should moreover be noted that instead of transmitting the identity of the calling station from the register to the adapter circuit and from there to the storage device in the called subscriber set, this identity could also be directly transmitted to this storage device as is done in the device according to the above-mentioned Dutch Patent.

When in the above-mentioned telephone system a call is made by a subscriber, for instance by set A1, relay A*sr* is energized upon hooking off the telephone in this set. Consequently, relay I*br* is energized, followed by the operation of relay T*cr* via contacts *k*1 and *lb*3 and the left-hand winding of this relay. Due to this a loop is closed towards the line circuit of the subscriber set A1 via line wire *a*, contacts *oc*2, *lb*4, *tc*2 and *k*2, coil L2, contact *oc*3 and line wire *b*, due to which the outgoing call of the subscriber set A1 is in fact repeated. When this line circuit is seized, relay K*r* is energized followed by relay T*dr* which is energized via contacts *k*1 and *tc*1 and the right-hand winding of relay T*cr*. Due to the displacement of contacts *td*1 and *td*2 of this relay the line circuit is switched through to the subscriber set A1 so that relays A*sr* and L*br* both release. Upon hooking off the telephone in the subscriber set A1, relays K *r*, T*cr* and T*dr* finally release so that the corresponding circuit is again free.

While the principles of the invention have been described above in connection with specific apparatus, it is to be clearly understood that this description is made only by way of example and not as a limitation on the scope of the invention.

We claim:

1. Telecommunication switching system including a plurality of subscriber stations divided into a plurality of classes, switching means for interconnecting selected subscriber stations, control circuits including registers for operating said switching means to establish communications between calling and called stations, identifying means for determining the identity of each calling station, means comprising an adapter circuit associated with each called station of a predetermined class for starting the operation of said identifying means which subsequently transfers the identity of said calling station to a storage device associated with said adapter circuit a circuit means which indicates the class of the called station, means for interrogating said circuit means responsive to one of said control circuits associated with the exchange of the called station after the number of the called station has been registered in said control circuit, and means for starting said adapter circuit which in turn starts said identifying means responsive to the detection of a called station of said predetermined class.

2. Telecommunication switching system according to claim 1, wherein said identifying means transfers said identity of said calling station to said storage device in the form of multifrequency signals.

3. Telecommunication switching system according to claim 1, wherein, said circuit means which indicates the class of the called station is common to the exchange to which the called station belongs.

4. Telecommunication switching system according to claim 1, wherein the identity is registered by said identifying means prior to being transmitted.

5. Telecommunication switching system according to claim 2, wherein, when the calling and called stations belong to the same exchange, the identity of the calling station determined by the identifying means is registered in the control circuit associated to the exchange of the called station and is subsequently transmitted to said storage device in the form of said multifrequency signals.

6. Telecommunication switching system according to claim 2, wherein, when the calling and called stations belong to different exchanges the identity of the called station is registered in a control circuit associated to the exchange of the calling station and is subsequently transmitted by said control circuit to the control circuit associated with the exchange of the called station in the form of multifrequency signals, and that the identity of the calling station determined by the identifying means is registered in said control circuit associated to the exchange of the calling station and is subsequently transmitted by said control circuit to said storage device in the form of said multifrequency signals.

7. Telecommunication switching system according to claim 1, wherein said storage device is individually associated to a called station of said predetermined class.

8. Telecommunication switching system according to claim 7, wherein said storage device forms part of an adapter circuit which is coupled between the line circuit of the called station of said predetermined class and said called station itself.

9. Telecommunication switching system according to claim 8, wherein said called station includes another storage device and that said adapter circuit is provided with means for transmitting the identity of the calling station registered in the register device to said other register device after the subscriber loop has been closed in said called station.

10. Telecommunication switching system according to claim 9, wherein said identity is transmitted to said other storage device during said communication in the form of AC pulses over two lines wires in parallel.

11. Telecommunication switching system according to claim 10, including means for maintaining busy the line circuit of the called station as long as said identity has not been transmitted to said other storage device.

12. Telecommunication switching system comprising register means in an exchange having an operator's location, means for extending connections to said exchange from another exchange to which a called station belongs, adapter circuit means associated with the called exchange for storing an identity of the calling line before the call is completed to the called line, means responsive to a special signal from the called station indicating that the calling station has made a malicious call for transmitting the calling line identity from said adapter circuit means to said register means at the operators exchange thus giving the identity of the calling station after the subscriber loop has been closed in said called station.

13. Telecommunication switching system according to claim 12, wherein said special signal is constituted by temporary openings of said closed subscriber loop, e.g. by means of a dialling disc of the telephone set of the called station.

14. Telecommunication switching system according to claim 13, wherein upon the closure of said subscriber loop in the called station a loop towards the associated line circuit is closed in the associated adapter circuit, said loop including means to maintain said loop closed when said special signal is transmitted from said subscriber station to said adapter circuit.

15. Telecommunication switching system according to claim 12, wherein, said adapter circuit includes means to receive said special signal and to subsequently operate second switching means which intervene in the establishment of a connection between the storage device in the adapter circuit and the other storage device arranged at the operator's location.

16. Telecommunication switching system according to claim 15, wherein, after the receipt of said special signal in the adapter circuit, a loop towards the second switching means is closed in said adapter circuit.

17. Telecommunication switching system according to claim 16, wherein, after the receipt of said special signal said adapter circuit is characterized by a characteristic potential and that said second switching means and said switching means first establish a connection between said adapter circuit and a control circuit of the exchange of the called station, said control circuit controlling said switching means upon the detection of said characteristic potential in order to complete the connection between the storage device in the adapter circuit and said other storage device at the operator's location.

18. Telecommunication switching system according to claim 17, wherein, said switching means include at least first line selectors, second line selectors, group selectors, incoming group selectors and final selectors and that said second switching means are constituted by at least one preselector which is arranged between said adapter circuit and said second line selectors.

19. Telecommunication switching system according to claim 18, wherein, after the transmission of the identity of the calling station the operator is brought in communication with the called station.

20. Telecommunication switching system according to claim 19, wherein, after the operator has been brought into communication with the called station this operator transmits a signal to the cord circuit of the communication established due to which a count pulse is transmitted in said cord circuit to the adapter circuit via the first and second switching means in order to reset the adapter circuit to its rest condition.

21. Telecommunication switching system according to claim 20, wherein, the identity of the adapter circuit is permanently registered in the storage device of this circuit, said identity being transmitted to said other storage device together with the identity of the calling station.

22. Telecommunication switching system according to claim 20, wherein the identity of the called station is permanently registered in the storage device of the associated adapter circuit, said identity being transmitted to said other storage device together with the identity of the calling station.

23. Telecommunication switching system according to claim 22, wherein said storage device is adapted to transmit a signal to the identifying means after the receipt of the identity of the calling station in order to switch said switching means under the control of the called station.